United States Patent [19]
Channin

[11] 3,838,908
[45] Oct. 1, 1974

[54] GUIDED LIGHT STRUCTURES EMPLOYING LIQUID CRYSTAL

[75] Inventor: Donald Jones Channin, Cranbury, N.J.

[73] Assignee: RCA Corporation, New York, N.Y.

[22] Filed: Feb. 22, 1973

[21] Appl. No.: 334,600

[52] U.S. Cl....... 350/160 LC, 350/96 WG, 350/150
[51] Int. Cl.............................................. G02f 1/16
[58] Field of Search................. 350/160 LC, 96 WG

[56] References Cited
UNITED STATES PATENTS

| | | | |
|---|---|---|---|
| 3,567,309 | 3/1971 | Jasgur | 350/156 |
| 3,674,336 | 7/1972 | Kogelnik | 350/160 LC UX |
| 3,726,584 | 4/1973 | Adams et al. | 350/160 LC X |
| 3,758,195 | 9/1973 | Hedman et al. | 350/160 LC |

OTHER PUBLICATIONS

J. M. Schnur & T. G. Giallorenzi, "Prospectus for the Development of Liquid–Crystal Waveguides," NRL Report 7507, Nov. 10, 1972.

R. F. Bush & P. E. Seiden, "Liquid Crystal Display Device," IBM Tech. Disc. Bull. Vol. 14, No. 1, p. 223, June 1971.

*Primary Examiner*—Edward S. Bauer
*Assistant Examiner*—Matthew W. Koren
*Attorney, Agent, or Firm*—H. Christoffersen; S. Cohen

[57] ABSTRACT

Liquid crystal is employed as a light waveguide or is located in the evanescent field of a light waveguide formed of passive material. By controlling the condition-light scattering or not, of the liquid crystal, the light conducted by the waveguide may be blocked, deflected, coupled to a second medium, employed for display purposes or used in other ways.

6 Claims, 18 Drawing Figures

GUIDED LIGHT STRUCTURES EMPLOYING LIQUID CRYSTAL

There have been many reports in the literature in recent years of arrangements for electrically controlling the light conducted by an optical waveguide. The waveguide may be formed of active material (material whose optical characteristics are controllable by, for example, electrical means) as discussed in articles such as: Hall, D., Yariv, A., and Garmine, E. Applied Physics Letter 17, 127 (1970); Hammer, J. M. Applied Physics Letter 18, 147 (1971); and Channin, D. J. Applied Physics Letter 19, 128 (1971) or the waveguide may be formed of passive material with active material located in the evanescent field thereof. Structures of the latter type are discussed in Tien, P. K., Ulpich, R., and Martin, R. J., Applied Physics Letter 17, 447 (1970) and Kuhn, L. Dukss, M. L., Heidrich, P. F., and Scott, B. A. Applied Physics Letter 17, 265 (1970).

The paper: Sosnowski, T. P., "Polarization Mode Filters for Integrated Optics" Optics Communications 4, no. 6, 408 (1972) which deals with mode filters for optical-frequency, guided waves, suggests an electrically controlled mode filter which comprises a nematic liquid crystal on a thin film optical waveguide. The liquid crystal molecules initially are oriented parallel to the guided light wave propagation direction so that the index of refraction is lower than that of the waveguide. An electric field is applied to the liquid crystal with the electric field direction in the plane of the thin film waveguide but transverse to the guided light wave propagation direction. The result is the termination of the waveguiding action and the author attributes this to a change in the liquid crystal index of refraction from a value lower than to one higher than the index of refraction of the waveguide. He says that this, in turn, is due to a change in the direction of orientation of the liquid crystals molecules — from parallel to transverse to the guided wave propagation direction.

The invention of the present application employs liquid crystal in the evanescent field of a light waveguide or as a light waveguide. The state of the liquid crystal — light scattering or not, is employed to provide novel display structures illuminated by the guided light and other electrooptic arrangements as discussed in detail below.

The invention is illustrated in the following drawings of which.

Figure 1:
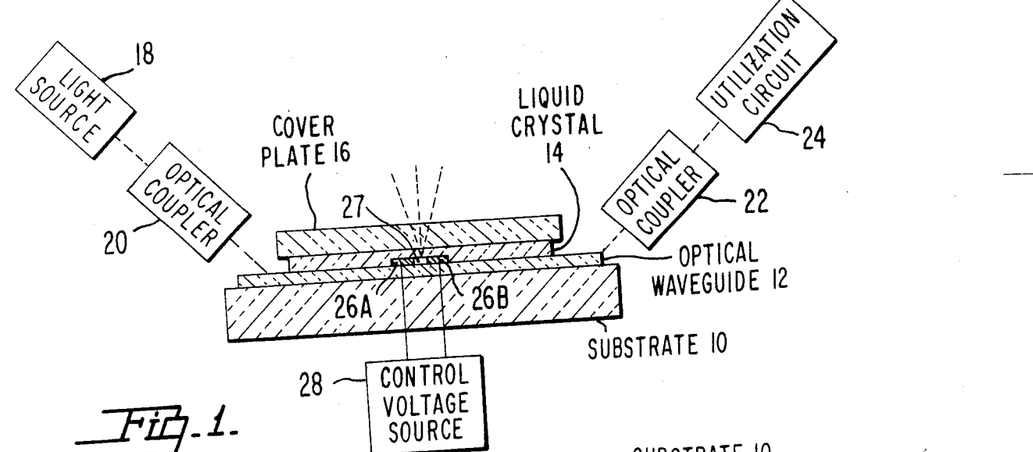
FIG. 1 is a schematic showing, partially in block form and partially cross-section, of a general form of electrooptic structure dealt with in this application.
Figure 2:
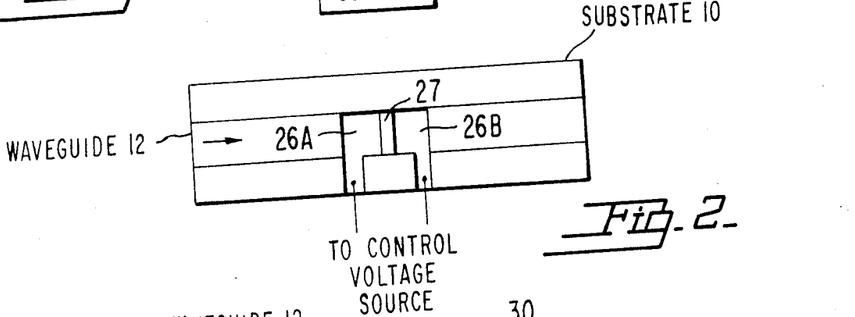
FIG. 2 is a plan view of a portion of the structure of FIG. 1.
Figures 3A, 3B, 4, 5:
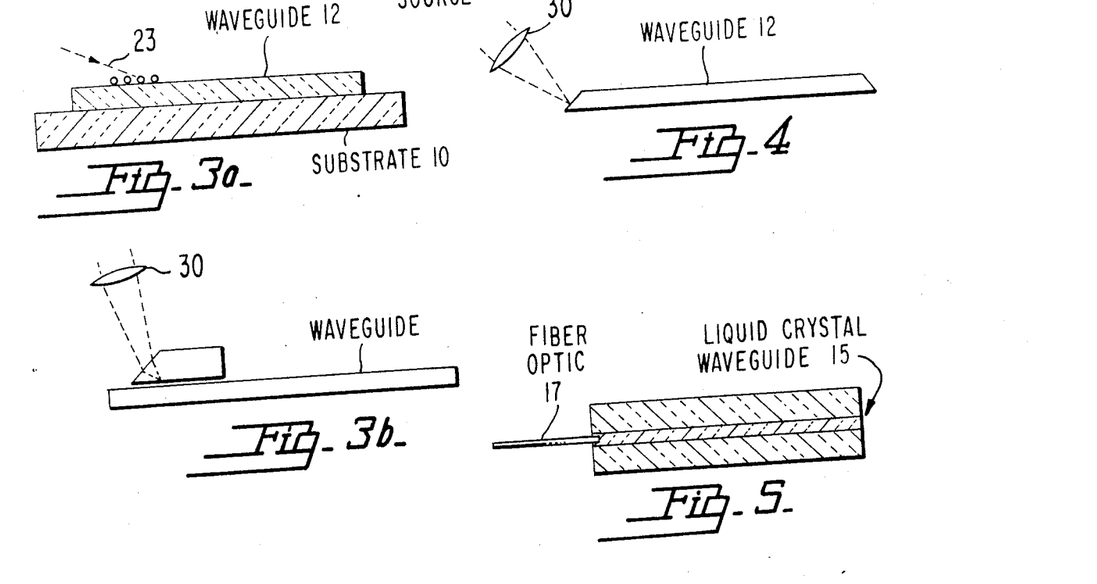
FIGS. 3a, 3b, 4 and 5 are schematic showings of various forms of optical couplers which may be used in the systems of the application.

The arrangement shown generally in FIGS. 1 and 2 includes a substrate 10 with a passive thin film optical waveguide 12, formed on one surface thereof. The waveguide may be formed of $Al_2O_3$ or any one of a number of other materials. A layer of liquid crystal 14, such as a nematic liquid crystal of the type operating on the principle of dynamic scattering, is held between a transparent cover plate 16 and one surface of the optical waveguide. The liquid crystal is in the so called evanescent field of the optical waveguide. That is, it is located in the exponentially decaying part of the light field conducted by the waveguide, which light field extends into the low index of refraction material (liquid crystal in the present instance) adjacent to the higher index of refraction waveguide material.

Light from source 18 is coupled into the waveguide by optical coupler 20. The light passing down the waveguide may be coupled out of the waveguide by optical coupler 22 and applied to an utilization circuit 24. Control of the light is achieved in the structure of FIGS. 1 and 2 by means of a pair of electrodes 26A, 26B which are connected to a control voltage source 28. Many different electrode structures are possible and the one shown in FIG. 2 is intended merely to be illustrative. In some forms of arrangements of the present application, the control voltage source is an alternating voltage source and in others it is a direct voltage source. A number of such alternatives are discussed below.

The optical couplers 20 and 22 are in themselves known and four typical configurations are illustrated in FIGS. 3a, 3b, 4 and 5 respectively. In the FIG. 3a arrangement, the coupler comprises a grating 23 on the surface of the waveguide 12. Its operation is described in M. L. Dakss et al., "Grating Coupler for Efficient Excitation of Optical Guided Waves in Thin Films," Applied Physics Letters, Volume 16, No. 12, June 1970. In the FIG. 3b arrangement, light is focused by an optical system, illustrated schematically at 30, onto the angular face of a prism. The prism may be spaced a small distance from the waveguide surface in the case of a passive waveguide or in physical contact with the waveguide in the case in which the waveguide is a liquid crystal (see FIG. 15). The optics are arranged so that the focal point is at approximately the waveguide surface and is at an appropriate angle to this surface to permit coupling from the radiation mode to the guided wave mode in which the light travels down the waveguide by internal reflections from the waveguide surfaces. In the FIG. 4 arrangement, the optical system 30 focuses the light onto an inclined end face of the waveguide 12. In the FIG. 5 arrangement, the liquid crystal serves as a waveguide 15 and coupling is via a fiber optic element 17. Translating a guided wave in the waveguide to a radiated wave also may be achieved by an optical coupler of the same type as shown but operating in the opposite direction.

In the operation of the arrangement of FIGS. 1 and 2, when the liquid crystal 14 is in its unexcited state, light couples into the optical waveguide, travels down the length of the waveguide and is coupled via coupler 22 to the utilization circuit 24. When the control voltage source 28 applies a voltage of sufficient magnitude across the electrode 26A, 26B, it excites the region 27 of the liquid crystal between the two electrodes and that region of the liquid crystal changes from its quiescent to its light scattering condition. In a simple form of the structure, it may be assumed that the entire region 27 between the two electrodes is uniformly light scattering. In this condition, it has been discovered that the liquid crystal because it is in the evanescent field of the waveguide, interacts with the light passing down the waveguide, absorbing the light energy and effectively acting as a valve to that light. In other words, the light in the guided wave mode, remaining beyond region 27, is reduced very substantially and with sufficient excitation, is reduced to substantially zero. This light is not lost but rather is translated to light in the radiation mode, which radiated light is scattered by the excited liquid crystal in region 27. As will be explained later, this phenomenon, that is, the coupling of light waves in a guided wave mode to light waves in a radiation mode, is employed in the present invention for display purposes. Also, by choosing appropriate electrode spacings and orientations, a number of new forms of deflectors and couplers are made possible, as is also discussed in greater detail below.

Figure 6:
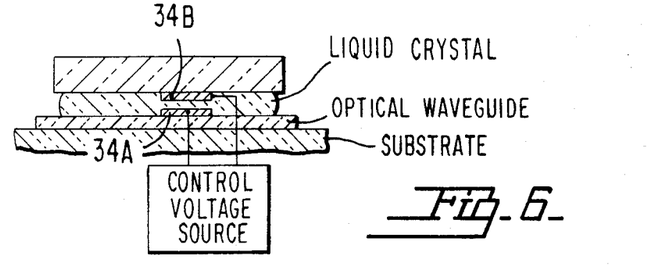
FIG. 6 is a schematic showing of a second form of electrode structure which may be used in arrangements of this application.

FIG. 6 is merely for the purpose of illustrating a second form of electrode structure. Here the electrodes 34A and 34B are located on opposite surfaces of the liquid crystal. This form of arrangement is especially useful for display purposes and in this use at least one of the electrodes such as 34B is made transparent.

Figure 11:
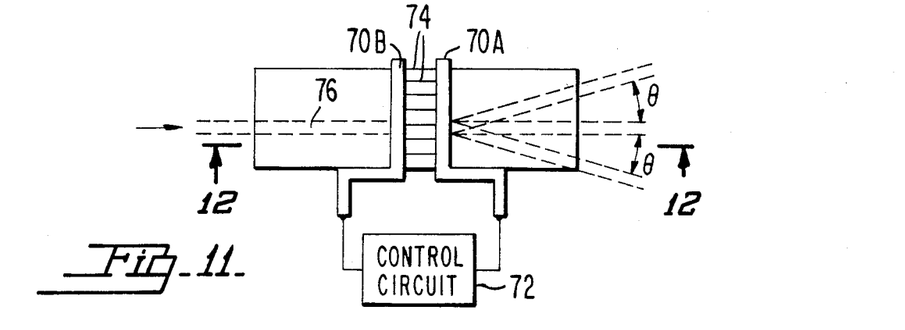
FIG. 11 is a plan view of an embodiment of the invention which is used as a light beam deflector.
Figure 12:
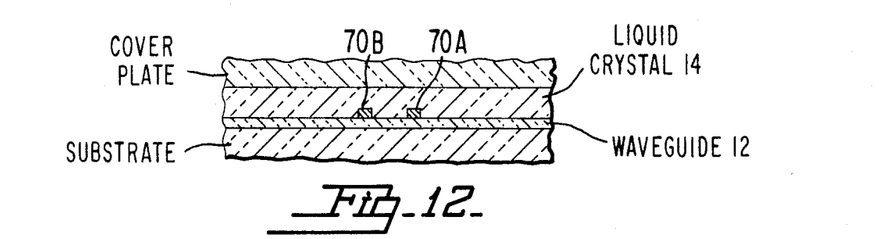
FIG. 12 is a section along line 12—12 of FIG. 11.

FIGS. 11 and 12 illustrate an embodiment of the invention which is useful as a light deflector. The liquid crystal 14 may be one of the nematic type operating on the principle of dynamic scattering and is located in the evanescent field of waveguide 12. The waveguide is formed of passive material. By proper choice of the spacing of electrodes 70A and 70B and proper choice of the direct control voltage applied to these electrodes by control circuit 72, a periodic domain structure may be excited in the liquid crystal, as illustrated schematically by the horizontal lines 74 extending between the electrodes. The domain spacing, that is, the space between the dark lines, is a function of the voltage applied to the two electrodes and the spacing between the electrodes.

In one specific design, the electrodes were spaced 125 microns apart, in a MBBA nematic liquid crystal layer 5 microns thick located in the evanescent field of waveguide and with the crystal dipoles perpendicular to the broad waveguide surfaces. At room temperature and at a voltage of 180 volts applied between the electrodes 70A, 70B, a spacing between domain lines of about 20 microns was obtained. W. Greubel and U. Wolff "Electrically Controllable Domains in Nematic Liquid Crystals," Applied Physics Letters, Volume 19, No. 7, Oct. 1, 1971, give other parameters for forming domains in certain highly purified nematic liquid crystals and suggest their use not in the way described herein but rather in the same way as a conventional grating (projecting light onto the liquid crystal, normal to the liquid crystal surface). This paper is not concerned with light waveguides.

In operation, if a guided wave 76 is transmitted down the optical waveguide 12 when a direct exciting voltage is applied between electrodes 70A, 70B, this light interacts with the domain structure in the liquid crystal and undergoes coherent scattering (diffraction). The scattering may be either of the thin-grating or of the Bragg type. In diffraction of the thin grating type, the incident light is substantially normal to the grating and diffracts into a plurality of beams at angles $\pm\phi_1, \pm\phi_2, \pm\phi_3 \ldots$, relative to the incident beam given by $$\sin \phi_m = m\lambda_0/\Lambda, \quad m=0, 1, 2 \ldots$$

where
 $\Lambda =$ the grating spacing
 $\lambda_0 =$ the wavelength of the light In diffraction of the Bragg type, the incident light is at an angle $\phi_B$ to the normal to the grating and the diffracted beams are at this same angle $\pm\phi_B$ to the normal, where $\phi_B$ is the Bragg angle and is defined by $$\sin \phi_B = \lambda_0/2\Lambda$$

As can be seen from the equations above, the amount of deflection ($\theta$) will depend upon the spacing between the lines ($\Lambda$ in the equations) of the periodic domain structure.

In the embodiment of FIGS. 11 and 12, the electrode orientation is such that the domain structure lines are substantially parallel to the direction of propagation of the incident light. The embodiment of FIG. 13 employs a similar pair of electrodes 80A, 80B, to the electrodes of FIG. 11; however, the electrodes 80A, 80B are oriented at right angles to the electrodes 70A, 70B. So oriented, the domain pattern in the liquid crystal has lines which are perpendicular to the direction of guided wave propagation in the waveguide 12.

Figure 13:
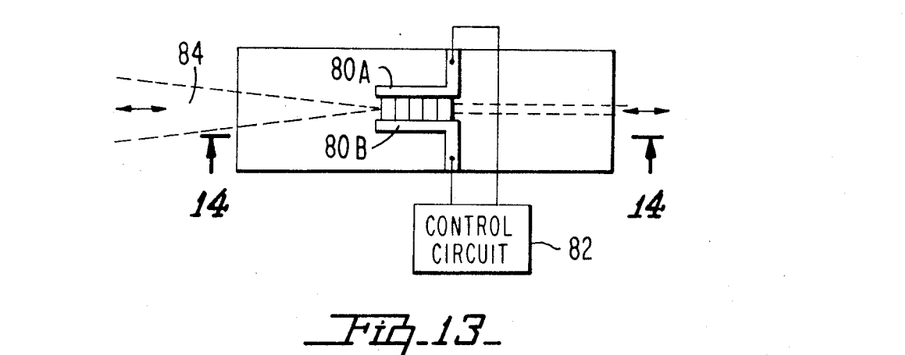
FIG. 13 is a plan view of a form of the invention suitable for a radiation-wave to a guided-wave coupler and vice versa.
Figure 14:
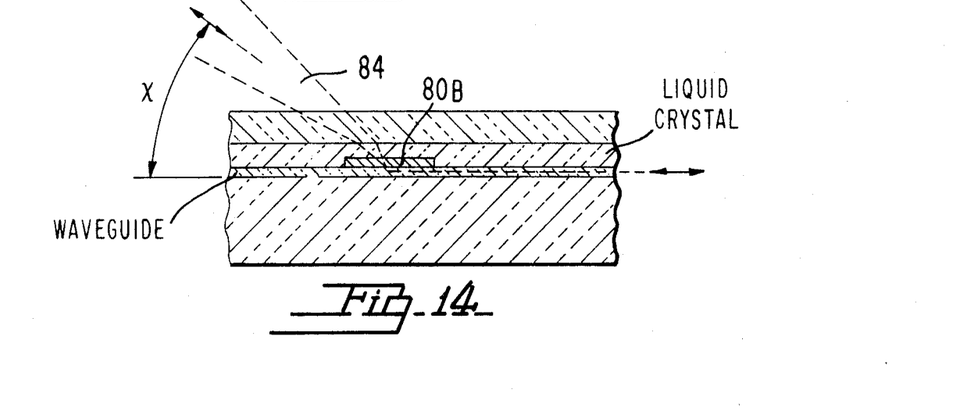
FIG. 14 is a section taken along line 14—14 of FIG. 13.

The structures of FIGS. 13 and 14 are useful both as a waveguide filter and as a coupler between light traveling in the guided wave mode and light in the radiation mode. In the operation as an optical coupler, a beam of light 84 is focused onto the domain structure produced by the electrode pair 80A, 80B. If the angle between the waveguide axis and the beam axis is properly chosen with respect to the spacing between the domain lines such that a phase matching condition ($c/v=\sin \theta + m\lambda_0/\Lambda$, $m=1, 2, \ldots$) well known in the art, is satisfied, then the beam 84 in the radiation mode will be coupled into the waveguide and transformed to a guided wave which travels down the guide in the direction from left to right. The phase matching condition depends also upon the wavelength of the light ($\lambda_0$) and the phase velocity (v) of the light in the waveguide mode, as is understood in the art. An important advantage of the structures of FIGS. 13 and 14 is the ability to control the spacing ($\Lambda$) between the periodic domain structure lines, such spacing being a function of the voltage applied by the control circuit 82.

In a manner similar to that discussed above, the periodic structure of FIGS. 13 and 14 may be employed to couple light from the waveguide to light in the radiation mode. Furthermore, in the same configuration, the periodic structure acts as a tunable filter for light traveling in the waveguide mode. The propagation of light in the waveguide mode may be terminated by making the domain spacing equal to an odd multiple of the wavelength of the guided light—the light propagating in the waveguide mode.

Figure 7:
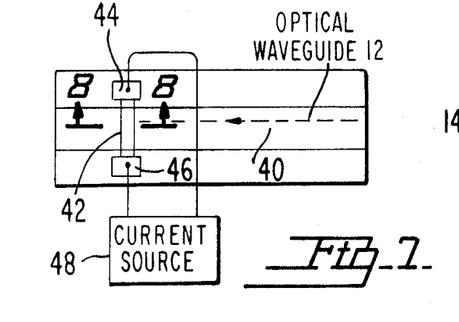
FIG. 7 is a plan view of a heat controlled embodiment of the invention.
Figure 8:
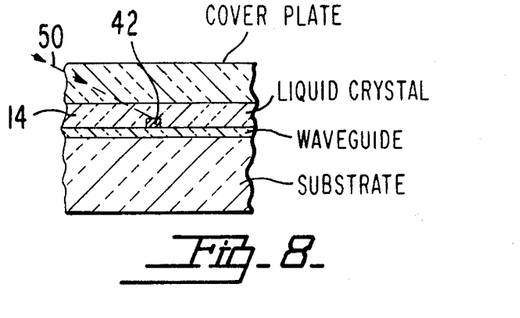
FIG 8 is a section taken through FIG. 7.

FIGS. 7 and 8 illustrate an embodiment of the invention which is useful as a deflector, filter and coupler. As in the embodiments of FIGS. 1, 2 and 11-14, the optical waveguide 12 is formed of a passive material and there is a liquid crystal 14 in the evanescent field of the optical waveguide. However, in this embodiment of the invention, the liquid crystal is formed of a material such as a mixture of cholesteryl chloride, cholesteryl nonanoate and cholesteryl oleyl carbonate, to provide a controllable periodic structure of helical form which can interact with light in the waveguide. The electrode in the embodiment of FIG. 7 comprises a high resistance wire 42 located between two tabs 44 and 46.

In one system according to FIGS. 7 and 8, the cholesteric liquid crystal initially is aligned by rubbing the cover plate and the waveguide surfaces, to orient the liquid crystals parallel to the direction of wave propagation—the direction indicated by arrow 40. When the current from source 48 is applied to the electrode 42, it changes the pitch of the periodic helical domain structure of the liquid crystal, the axes of the helices being parallel to the light wave propagation direction. This periodic helical structure can be employed to couple light directed along a path such as 50 in FIG. 8 into the waveguide and vice versa. The action is similar to that which has been described in connection with FIGS. 13 and 14.

In a second form of the invention illustrated in FIG. 7 and 8, the liquid crystal initially is aligned perpendicular to the direction of light propagation 40, again by rubbing the cover plate over the liquid crystal on the waveguide surface, but this time in a direction perpendicular to that discussed above. With this initial alignment, when the liquid crystal is heat excited by passing a current through the heating element 42, the light passing down the optical waveguide remains in the guide but is deflected through an angle proportional to the amount of current supplied by current source 48, that is, proportional to the amount of heating of the liquid crystal. In this embodiment, the heating changes the pitch of the helically shaped domains in the liquid crystal; however, the axes of the helices are perpendicular to the direction of wave propagation and parallel to the waveguide surfaces. This phenomenon is similar to the one discussed in connection with FIGS. 11 and 12, the deflection angle lying in the plane of the waveguide surface, just as the angle $\theta$ in FIG. 12.

Figures 9, 10:
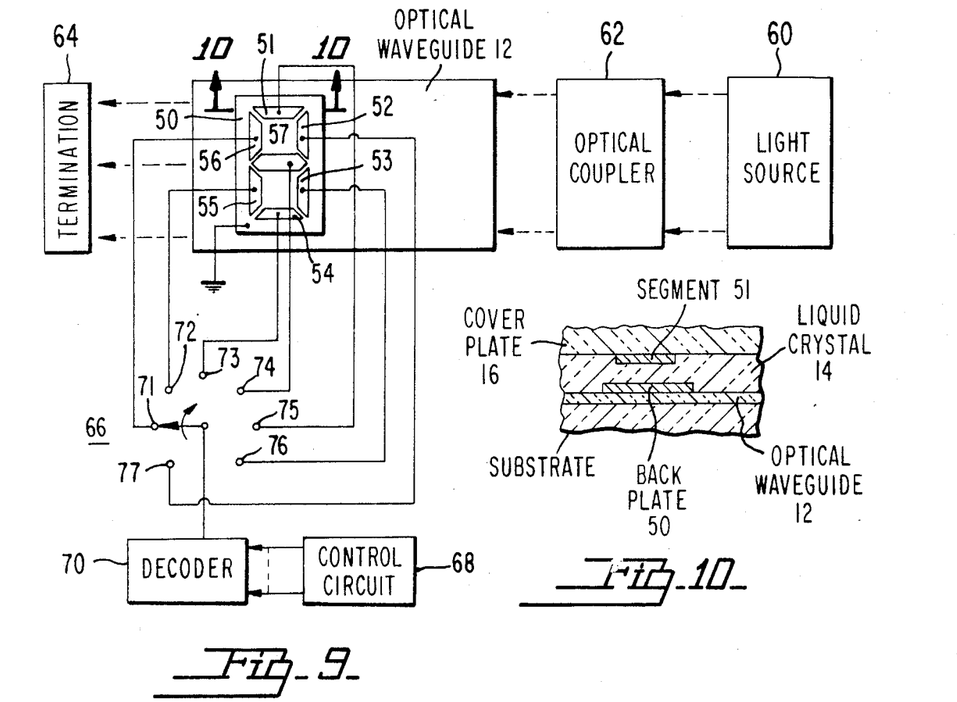
FIG. 9 is a diagram, partially in block form, of a display system embodying the invention.
FIG. 10 is a section taken along line 10—10 of FIG. 9.

FIGS. 9 and 10 illustrate a display arrangement in accordance with the invention. The display in this particular instance is shown as a seven-segment numeric indicator. The back plate 50 is located on one surface of the optical waveguide 12 and the seven segments 51-57 are located on the lower surface (FIG. 10) of the transparent cover plate 16. The segments are formed of transparent conductors and the backplate 50 may be formed of a reflecting conductor. Here and elsewhere, frontplate and backplate are so identified with respect to the viewing direction, that is, the frontplate is between the viewer and the segments and the segments are between the viewer and the backplate. The substrate is behind the waveguide and backplate, relative to the viewer.

The system of FIG. 9 includes a light source 60 and a coupler 62 for coupling the light from the source into the passive optical waveguide 12. The waveguide is preferably terminated by a nonreflecting termination 64.

The backplate 50 may be grounded and the segments 51-57 connected to the contacts of a multiple position switch 66. For purposes of the present explanation, the switch is shown as a mechanical switch; however, in practice it may be an electronic switch. A control circuit 68 connects to a decoder 70 which supplies an exciting voltage, which in the present instance is preferably a low-frequency, alternating voltage, through the switch 66 to the segments.

In the operation of the system of FIG. 9, the control circuit 68 supplies successive groups of signals, indicative of the segments to be excited, to the decoder. The decoder produces an output in response to each group of signals, which output, in the event of no excitation, is a zero amplitude signal and in the event of excitation, is an alternating voltage signal of sufficient amplitude to cause the liquid crystal to become excited.

The invention may be illustrated by way of the following specific example, namely, selection of the numeral 3. In this event, when the switch 66 is engaged with contact 71, the control circuit 68 instructs the decoder to apply a zero amplitude signal to contact 71. The liquid crystal between segment 56 and the backplate 50 does not become excited and the light passing down the optical waveguide 12 is not disturbed. When this light reaches the nonreflecting termination 64, it is dissipated. Within a short time interval, in the millisecond range, the switch arm of switch 66 engages contact 72 and the control circuit 68 applies a new set of signals to the decoder. This set also causes the decoder to produce zero output voltage so that liquid crystal beneath segment 55 does not become excited. During the next interval of time, switch 66 moves to contact 73 and the control circuit 68 applies a group of signals to the decoder 70 to cause the decoder to apply a low frequency alternating voltage to the switch. This voltage causes the liquid crystal beneath segment 54 to become excited. As a result, the light passing down the waveguide and which passes through the region between segment 51 and the backplate 50 is diverted from the waveguide mode to the radiation mode and is scattered by the excited liquid crystal. The result is illumination of the segment 54 and this illumination is visible through this segment, as the segment is transparent, and through the transparent cover plate 16 (FIG. 10).

The process described above continues until the switch 66 has made one complete revolution. By that time, the segments 51, 52, 53, 54 and 57 have been illuminated, causing the numeral 3 to be displayed. Due to the relatively slow decay time of the liquid crystal and due also to the persistence of vision, this number 3 remains "on" for a sufficiently long period of time to be viewed by the observer and the display can be refreshed when it starts to decay by repeating the process above.

The sequential nature of the addressing is of interest in cases where one segment is behind the other with respect to the direction of light propagation. With this kind of addressing, in a case where say segments 53 and 55 both must be "on," the illumination of the segment 55 occurs first and then the illumination of segment 53 occurs. It is important that this kind of sequence be followed to prevent one segment from interfering with another. For example, if segment 53 were turned on first and then segment 55, segment 53 would cause the light passing down the waveguide to be transformed into light in the radiation mode and there would be no light left or there would be a much smaller amount of light left, to illuminate segment 55, in view of the relatively long decay time of the liquid crystal beneath segment 53. This same kind of sequencing is employed in the case of a multiple digit numeric or alphanumeric indicator. That is, the segments further down the stream relative to the direction of guided light propagation are turned on prior to those which are up stream.

Figure 15:
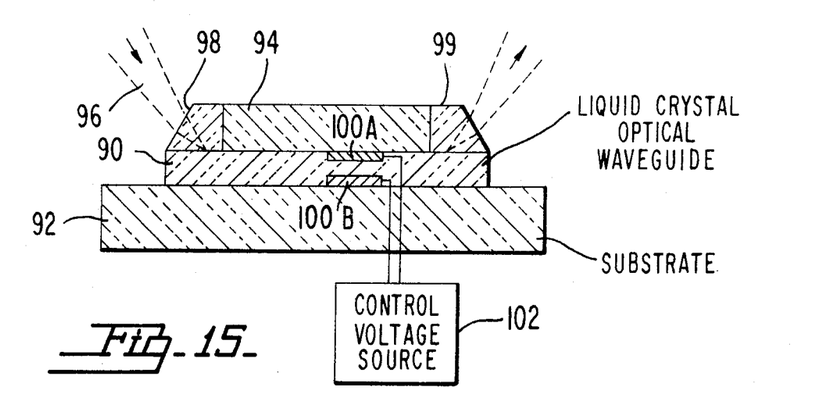
FIG. 15 is a cross-section through an electrooptic arrangement in which the liquid crystal acts as an optical waveguide.

Most of the arrangements discussed up to this point have been described in terms of liquid crystal located in the evanescent field of a passive optical waveguide. A number of these structures also can be made to operate utilizing the liquid crystal itself as the waveguide. An elementary form of such a structure is illustrated in FIG. 15. The liquid crystal 90 is located between the substrate 92 and the cover plate 94 formed of a material such as fused quartz. The optical couplers in this embodiment comprise two high index glass prisms 98 and 99 such as the prism of FIG. 3b. Focused light 96 is projected onto the end surface 98, as shown.

Various forms of electrodes are possible and those shown at 100A, 100B are merely examples. The control voltage source 102 is for the purpose of exciting the liquid crystal and depending upon the specific embodiment, may be means for applying either an alternating voltage or a direct voltage to the electrodes.

Figure 16:
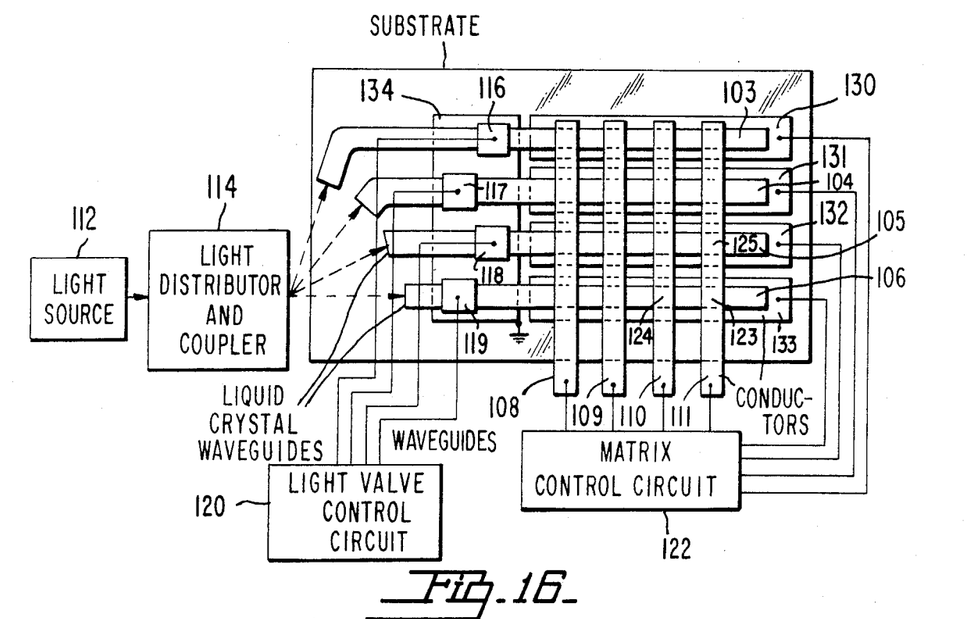
FIG. 16 is a diagram, partially in block and partially in plan view, of a display system embodying the invention.

FIG. 16 schematically shows a four-by-four display matrix in accordance with another embodiment of the invention. It is to be understood, of course, that the sixteen locations shown are an example only and, in practice, there may be many more than 16 locations.

The system of FIG. 16 includes four liquid crystal waveguides 103–106 respectively, each having a structure somewhat similar to that shown in FIG. 15. Liquid crystal waveguides are located on four row conductors 130–133, respectively, which in turn are on a substrate. The waveguides are located between the row conductors and a cover plate (not shown) and the column conductors 108–111 are located on the lower surface of the cover plate.

This system also includes a light source 112 and light distributor and coupler 114. In one form of the invention, the distributor 114 may consist of an electromechanical or an electronic light deflector for deflecting the light from the source 112 first into waveguide 106, then into waveguide 105 and so on. In a second form of the system according to the invention, the light distributor concurrently supplies light to all four optical waveguides 103–106 respectively.

In the last mentioned form of the invention there are four electrodes 116–119, one per liquid crystal waveguide, each operating as a light valve. The condition of the light valve is controlled by the light valve control circuit 120.

In the operation of the last-mentioned embodiment of the invention, the four liquid crystal waveguides have light supplied thereto continuously. The light valve control circuit maintains an electric field between the common back plate 134 and three of the electrodes and no field between the back plate and the fourth electrode. For example, to start with, the control circuit 120 may apply a low frequency alternating voltage between the back plate 134 and electrodes 116, 117 and 118 and no voltage to electrode 119. The liquid crystal beneath the electrodes 116, 117 and 118 becomes excited and the light passing down waveguides 103, 104 and 105 is essentially blocked, that is, it is transformed from guided light to radiated light. Preferably a mask is placed over these electrodes 116-119 to prevent the radiant light scattered from the liquid crystal from reaching the eye of the viewer.

The matrix control circuit 122 now scans the array from right to left one row at a time, that is, it applies voltages or not, according to the pattern desired, first between conductors 111 and 133, then between 110 and 133, then between 109 and 133, then between 108 and 133. If the voltage is applied between conductors such as 111 and 133, the location 123 in the matrix where electrode 111 crosses the liquid crystal waveguide 106 becomes illuminated by the guided light in the waveguide 106. Other locations, such as 125, along electrode 111, receive neither light excitation nor fullselect electrical excitation. During the next time interval, the next location 124 is accessed and it becomes illuminated or not dependng upon the voltages applied by the control circuit 122, and so on.

After the bottom row 106 is accessed, the same procedure is followed with respect to the next row, the one containing liquid crystal waveguide 105. Now an excitation voltage is supplied to electrodes 119, 117 and 116 and excitation is removed from control electrode 118. In this particular application, it is desired that the valve represented by electrode 118 open very rapidly rather than depending upon the natural relaxation time of the liquid crystal. Such operation can be achieved by using one of a number of known fast-erase techniques. One such technique is to apply a relatively high frequency erase signal to electrode 118. Alternatively, by choosing voltages of proper value, the liquid crystal beneath the valves can be operated in the field effect operating mode (where the relaxation time is relatively short), whereas the display locations may be operated in the dynamic scattering mode.

The process described above continues until the entire array is scanned. The natural relaxation time of the liquid crystal and the persistence of vision are depended upon to maintain the display "on" for a sufficient interval to permit one frame of the displayed image to be viewed. This display may be refreshed, in periodic fashion, by repeating the process above analagously to the scan of a television display. Preferably, the excitation of the liquid crystal is by a low frequency alternating voltage with zero direct voltage component to insure long life for the liquid crystal. This can be achieved by straight alternating voltage, excitation by unipolarity alternating voltage excitation, as described, for example, in Mao U.S. Pat. No. 3,653,745, or in a number of other ways now known in the art.

In the first embodiment of the display of FIG. 16, in which the light distributor comprises a light deflector which applies light to only one of the waveguides at a time, the light valve control circuit 120 and the electrodes 116–119, and 134 may be dispensed with.

In the system discussed above, any one of the couplers in FIGS. 3–5 may be employed. However, a particularly attractive coupler for this embodiment is a fiber optics coupler. The end of a fiber optic element may be located right in the liquid crystal. In one embodiment of the display of FIG. 16, all fiber optic elements may be illuminated at the same time. In the second embodiment of FIG. 16, the other end of the fiber optic elements may be arranged in a circle and successively scanned by a light source in a manner analagous to that described in Clay et al. U.S. Pat. No. 3,249,692.

Figure 17:
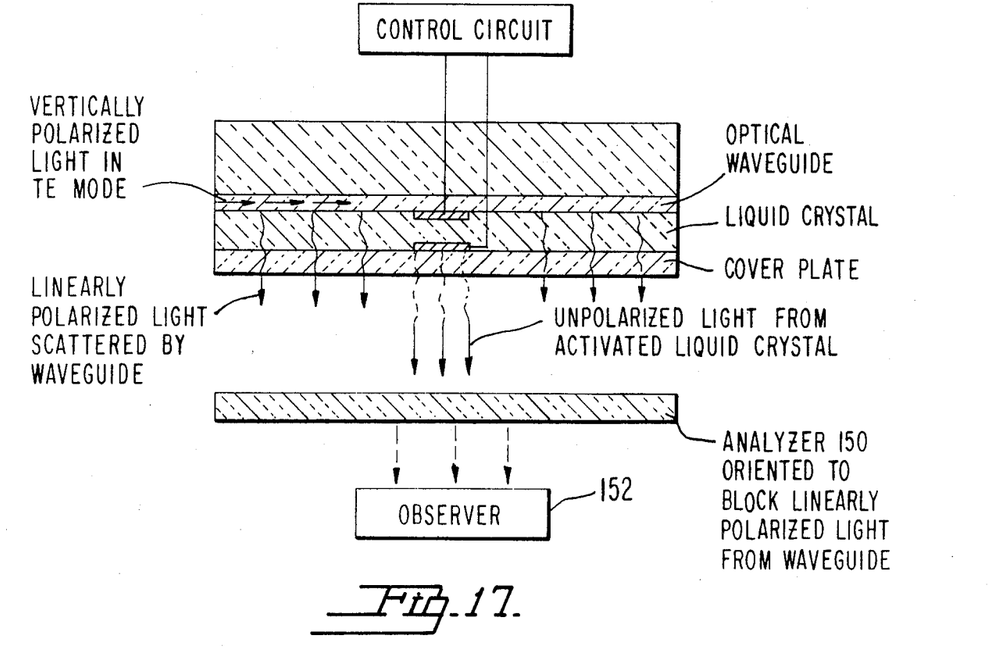
FIG. 17 is a diagram, partially in block form and partially in cross section, of a display system embodying the invention, with means for improving the contrast-ratio.

FIG. 17 shows a method of enhancing a display. In a display of this kind which employs a liquid crystal in the evanescent field of an optic waveguide, imperfections in the waveguide walls cause some scattering of the light. It is found when the light employed is in the transverse electric (TE) mode, polarized with the electric vector in the plane of the waveguide and perpendicular to the plane of the paper, the light scattering which results from the waveguide walls is polarized with the electric vector in the same direction. On the other hand, the light which is scattered by the excited liquid crystal is not polarized. The reason is that the light scattering is produced by liquid crystal domains which are in a highly agitated state, sometimes known as the turbulent state.

In accordance with the present invention, an analyzer 150 is employed between the display and the observer 152. The analyzer is oriented to block the linearly polarized light scattered by the waveguide. The light scattered from the liquid crystal is unpolarized so that only a very small portion of this light is blocked by the analyzer. Accordingly, the contrast-ratio is greatly improved.

A number of embodiments of the present invention have been described in which the light waveguide is formed of a passive material and liquid crystal is located in the evanescent field of the waveguide and others have been described as being formed of an active material, namely liquid crystal. In some cases operation in one way is preferred over the other and in some cases operation in both modes are possible. Placing the liquid crystal in the evanescent field is preferred when the desirable properties of passive waveguides such as low loss, thinness, ability to be fabricated in curves and stripes and so on are to be exploited. Thus, this mode of operation is especially appropriate for the embodiments of FIG. 11 and 13 in which a coupling or switching function is applied to the waveguide. It also would be suitable for the display of FIG. 16 rather than using the liquid crystal as the waveguide, if the loss in the liquid crystal were found to be excessive as it could be in a very large area display.

Making the liquid crystal itself the waveguide makes it possible to maximize the coupling between the liquid crystal and the light. This is appropriate for high speed modulation and switching as in the embodiments of FIGS 1, 2 and 6, as examples. Moreover, it faciliates the coupling of light to the waveguide as, for example, by means of fiber optics since it allows insertion of the fibers directly into the waveguide.

I claim:

1. A display system comprising, in combination:
   a matrix of conductors arranged in columns and rows;
   a plurality of rows of light waveguides, equal in number to the number of rows in the array, each light waveguide including liquid crystal in the light field of said waveguide, each light waveguide lying adjacent to a row conductor and between that row conductor and the column conductors;
   means for selectively coupling light to the input end of each light waveguide; and
   means for selectively applying voltages to said columns and rows of conductors for selectively exciting the liquid crystal at the intersections of said columns and rows.

2. A display system as set forth in claim 1, wherein each light waveguide is formed of a passive light conductor and wherein said liquid crystal is located in the evanescent field of each said light waveguide.

3. A display system as set forth in claim 1, wherein each light waveguide is formed of said liquid crystal.

4. A display system as set forth in claaim 1, wherein said means for selectively coupling light comprises means for applying light, in parallel, to the input end of all of said waveguides; a plurality of liquid crystal light valves, each at the input end of a different waveguide; and means for selectively operating said light valves.

5. A display system as set forth in claim 4 wherein said liquid crystal light valves comprise: a common backplate; a plurality of control plates, one associated with each waveguide, each located adjacent to the backplate; and liquid crystal means between each control plate and the backplate, each liquid crystal means in the light field of a different light waveguide.

6. A display system as set forth in claim 1, wherein said means for selectively coupling light comprises a common light source; and means for deflecting said light for selectively applying the same to the input ends of said waveguides, one input end at a time.

* * * * *